United States Patent [19]

Bergmann

[11] 4,353,126

[45] Oct. 5, 1982

[54] METHOD FOR CODED DATA TRANSMISSION IN HALF-DUPLEX OPERATION BETWEEN DATA TERMINAL EQUIPMENT OF TWO DATA STATIONS

[75] Inventor: Eduard Bergmann, Luedenscheid, Fed. Rep. of Germany

[73] Assignee: Siemens Aktiengesellschaft, Berlin & Munich, Fed. Rep. of Germany

[21] Appl. No.: 165,792

[22] Filed: Jul. 3, 1980

[30] Foreign Application Priority Data

Jul. 19, 1979 [DE] Fed. Rep. of Germany ....... 2929252

[51] Int. Cl.³ .......................... H04L 9/00; H04L 5/14
[52] U.S. Cl. ..................................... 370/24; 178/22.17
[58] Field of Search ................ 178/2 A, 22.12, 22.13, 178/22.17; 179/1.5 S; 370/24, 29, 31, 32

[56] References Cited

U.S. PATENT DOCUMENTS

| | | | |
|---|---|---|---|
| 3,321,573 | 5/1967 | DeSilva | 178/2 A |
| 3,627,928 | 12/1971 | Wolper | 178/22.13 |
| 3,878,332 | 4/1975 | Morgan | 178/22.13 |
| 4,208,544 | 6/1980 | Burke | 178/22.17 |

FOREIGN PATENT DOCUMENTS 1762425  5/1970  Fed. Rep. of Germany ........ 370/31

*Primary Examiner*—Douglas W. Olms
*Attorney, Agent, or Firm*—Hill, Van Santen, Steadman, Chiara & Simpson

[57] ABSTRACT

A method for the coded data transmission in half-duplex operation between data terminal devices of two data stations employs a code device of the one data station to transmit a phase-in program to the code device of the other data station. Thereby, the code devices of the two data stations communicate via corresponding data transmission devices in full-duplex operation. After phase-in of crypto units of the two data stations in one direction, change of direction programs, data and end identifications are transmitted, and in the opposite direction, simultaneously, synchronizing signals are transmitted.

5 Claims, 4 Drawing Figures

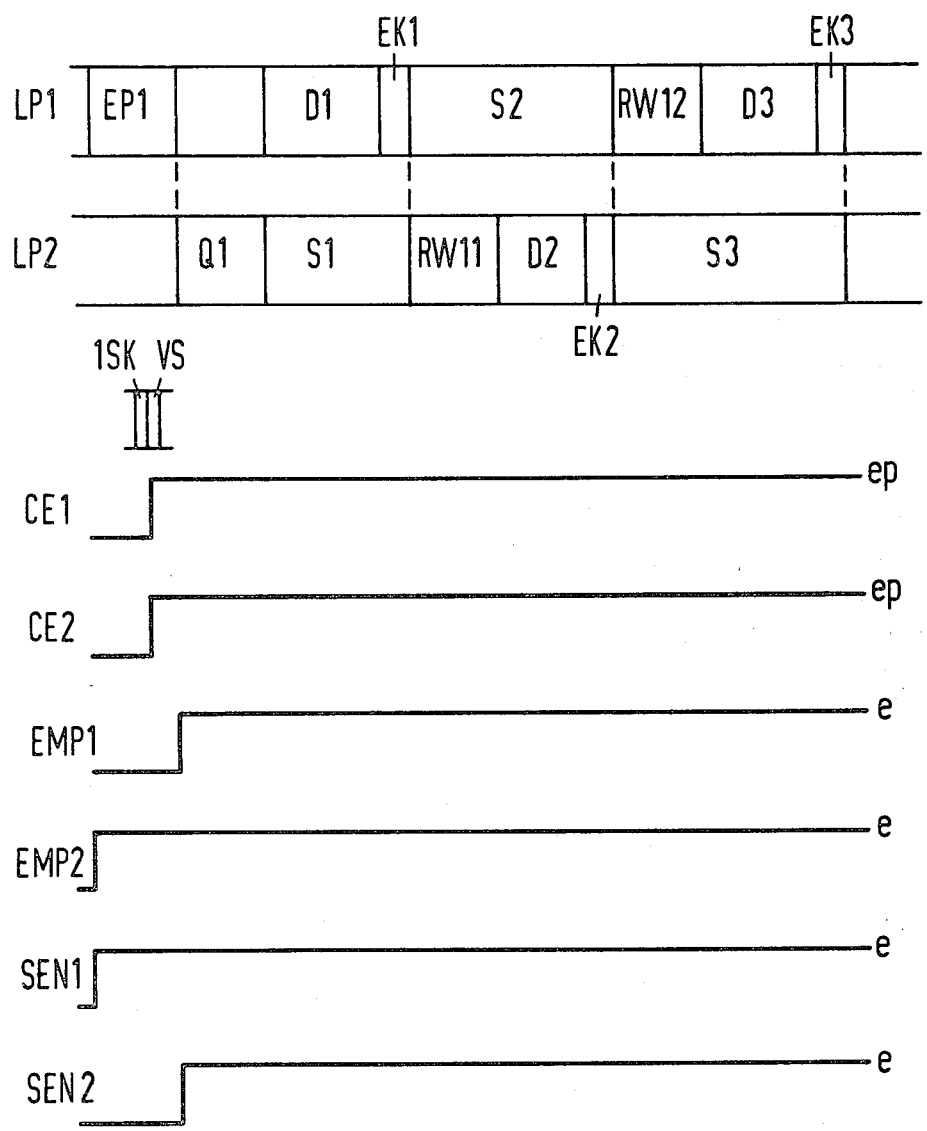

4,353,126

METHOD FOR CODED DATA TRANSMISSION IN HALF-DUPLEX OPERATION BETWEEN DATA TERMINAL EQUIPMENT OF TWO DATA STATIONS

BACKGROUND OF THE INVENTION

1. Field of the Invention

The present invention concerns a method for coded data transmission in half-duplex operation between data terminal equipment of two data stations, whereby a code device of the one data station transmits a phase-in program to the code device of the other data station and the other code device transmits an acknowledgment.

2. Description of the Prior Art

When data and an end identification are transmitted in half-duplex opertion, subsequently a change of direction can occur in order to be able to transmit data in the opposite direction. Changes of direction of this sort are introduced with change of direction programs which consist of one phase identification each, one first send identification each and one second send identification each. These change of direction programs are acknowledged from the opposing, remote station. Thereby, the crypto units are phased out in each case after the recognition of the end identification and are newly phased-in after the last bit of the first send identification. This method has the disadvantage that the efficiency of the data transmission is reduced by the change of direction programs to be transmitted with 120 bits each.

In order to raise the data transmission rate, it would be essentially conceivable to transmit the data in full-duplex operation. However, for this, a relatively large technical expense is required.

SUMMARY OF THE INVENTION

The invention is based upon the problem of providing a method for coded data transmission, which, on the one hand, requires a lower technical expense than full-duplex data transmission methods, and the lost times of which, in the case of the phase-in, are relatively small.

The problem which forms the basis for the invention is solved by means of the following method steps:

A. The code devices of the two data stations communicate via the corresponding data transmission devices in full-duplex operation; and B. After phase-in of the crypto units of both data stations, in one direction, change of direction programs, data and end identification are transmitted, and in the opposite direction, simultaneously in each case, synchronizing signals are transmitted.

In comparison to the full-duplex data transmission methods, the invention distinguishes itself in that the technical expense which is required is relatively low, because the crypto units only have to be designed for half-duplex operation. In comparison to the customary half-duplex data transmission methods, the method according to the present invention distinguishes itself in that the lost times which are conditioned by the change of direction programs, are low, because these change of direction programs contain no phase identification. For example, the change of direction programs can consist of only the first send identification, so that in each case only 40 bits are required.

In order to guarantee a sure and rational synchronization, it is practical that the synchronizing signal consists alternatingly, out of, in each case two binary values of a first kind, or respectively, consists of, in each case, two binary values of a second kind.

BRIEF DESCRIPTION OF THE DRAWINGS

Other objects, features and advantages of the invention, its organization, construction and operation, will be best understood from the following detailed description, taken in conjunction with the accompanying drawings, on which:

FIG. 4 shows several diagrams which permit one to identify the time-related course of the system represented in FIG. 3.

DESCRIPTION OF THE PREFERRED EMBODIMENTS

Figure 1:
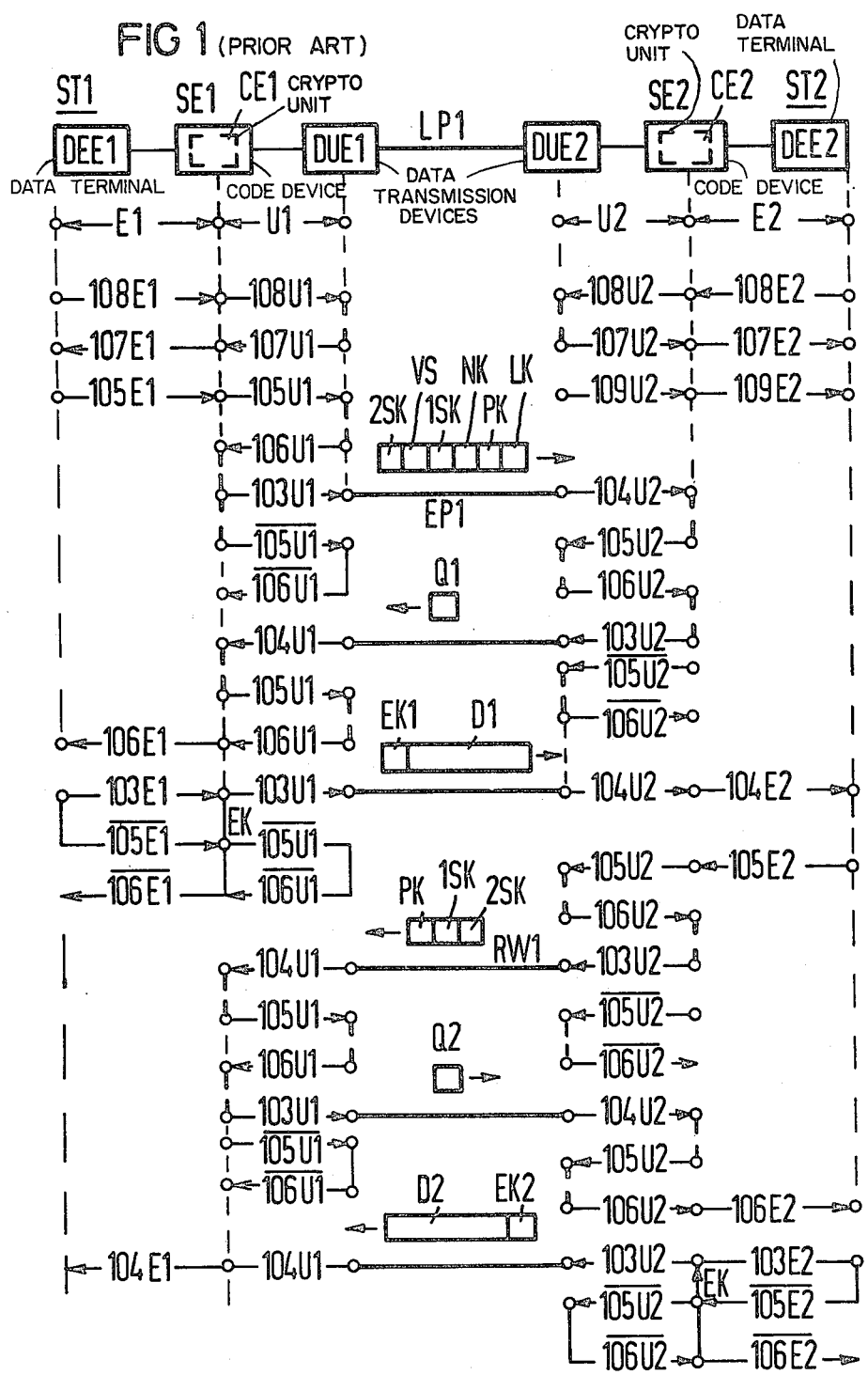
FIG. 1 shows a schematic representation of a customary half-duplex data transmission system.

FIG. 1 shows schematically the data transmission from a first station ST1 to a second station ST2 in half-duplex operation. In the region of the first station are located a data terminal equipment DEE1, a code device SE1 with a crypto unit CE1 and a data transmission device DUE1. In the region of the second station, are located a data terminal device DEE2, a code device SE2 with a crypto unit CE2 and a data transmission device DUE2. The two stations are connected with one another via a transmission circuit. For example, the transmission circuit can concern a line pair LP1 of a two-wire transmission line. The reference symbols E1, or respectively, E2 refer to the region between the data terminal device DEE1, or respectively, DEE2 and the code device SE1, or respectively, SE2. The reference symbol U1, or respectively, U2 refers to the region between the code device SE1, or respectively, SE2 and the data transmission device DUE1, or respectively, DUE2.

First, the production of the operational readiness of the data terminal device DEE1, the code device SE1 and the transmission device DUE1 will be described. For this, the data terminal device DEE1 transmits a signal via the line 108E1 to the code device SE1, from which this signal is passed on via the line 108U1 to the data transmission device DUE1. Via the line 107U1, the data transmission device DUE1 reports its operational readiness to the code device SE1. The code device SE1 reports this via the line 107E1 to the data terminal device DEE1. When the data terminal device DEE1 intends to transmit data, then it transmits via the line 105E1 a signal to the code device SE1, which signal is transmitted further via the line 105U1 to the data transmission device DUE1, and the signal occasions connection of the sending part of the data transmission device DUE1. The transmission readiness of the data transmission device DUE 1 is reported with a signal via the line 106U1 to the code device SE1.

By way of a line 103U1, from the code device SE1, a phase-in program EP1 is transmitted, consisting of a reset identification LK, a phase identification PK, a "non-conference" identification NK, a first send identification 1SK, a variable code VS and a second send identification 2SK.

The receiving code device SE2, via a line 109U2, receives a signal which indicates the receiving level. The code device SE2 is thereby switched to receive and signals, with a signal via the line 109E2, its receiving readiness to the data terminal device DEE2. Following this, the code device SE2 receives the phase-in program via the line 104U2. After the transmitting, or respectively, receiving of the first send identification 1SK, both crypto units CE1, or respectively, CE2 are started in a defined manner with the last character of the first send identification 1SK. After this, the line 105U1 is disconnected from the transmitting code device SE1 and in front of the data transmission device DUE1, the line 106U1 is disconnected. The disconnection of the lines is represented in FIG. 1 with a transverse dash. After completed phase-in, from the receiving code device SE2, via the line 105U2, a signal is transmitted to the data transmission device DUE2, and with this, the sending part of the data transmission device DUE2 is connected. With a signal via the line 106U2, the data transmission device DUE2 reports its transmitting readiness. Following this, via the line 103U2, the acknowledgement Q1 is transmitted to the data transmission device DUE1 from the code device SE2 via the line 103U2. From there, the acknowledgement is fed via the line 104U1 to the code device SE1.

If the acknowledgement has arrived at the code device SE1, then this again connects the transmitting part of the data transmission device DUE1, with a signal on the line 105U1, and waits for a signal on the line 106U1 which signals the transmitting readiness. Following this, the transmitting readiness is reported via the line 106E1 to the data terminal device DEE1.

The data terminal device DEE1 releases data via the line 103E1 to the code device SE1, where with the help of the crypto unit CE1, it is encoded. The coded data D1 are then transmitted via the line 103U1 and via the data transmission device DUE1 to the receiving data transmission device DUE2.

The receiving code device SE2 signals its receiving readiness with a signal via the line 109E2 to the data terminal device DEE2 and via the line 104U2, receives the transmitted data which was received via the data transmitting device DUE2. In the crypto unit CE2 of the code device SE2, the data D1 which were received on the line 104U2 are decoded and the decoded data are fed via the line 104E2 to the data terminal device DEE2.

The end of the data transmitted from the data terminal device DEE1 is reported by means of a signal via the line 105E1 to the code device SE1. This code device SE1 transmits the end identification EK1, which via the line 103U1, is transmitted via the two data transmission units DUE1, DUE2 to the code device SE2. The code device SE1 is stopped in a defined manner with the last bit of the end identification EK1. Via the line 105U1, the transmitted part of the data transmission device DUE1 is disconnected. Via the line 106E1, the transmitting readiness of the data terminal device DEE1 is disconnected. Following this, also the transmitting readiness of the data transmission device DUE1 is disconnected, and with a signal via the line 106U1, the disconnection is acknowledged; the transmitting code device SE1 passes into its rest position.

The receiving code device SE2, after recognition of the end identification EK1, also goes into its rest position, in which the crypto unit CE2 is stopped in a defined manner with the last character of the end identification EK1. With this, the receiving code device SE2 is ready for a change of direction.

When the data device DEE2 releases a signal via the line 105E2, then this means that a change of direction is to proceed, because the data terminal device DEE2 now intends to transmit. Therefore, a transfer occurs from receiving to transmitting. The code device SE2 now transmits a signal via the line 105U2 to the data transmission device DUE2, which causes the connection of the transmitting part. Via the line 106U2, the code device SE2 waits for an answer-back (acknowledgement signal) with respect to the transmitting readiness of the data transmission device DUE2. After receiving of this answer-back (acknowledgement) signal, the code device SE2 transmits a change of direction program RW via the line 103U2.

The change of direction program RW consists of the phase identification PK, the first send identification 1SK and the second send identification 2SK. After the transmitting, or respectively, receiving of the first send identification 1SK, both crypto units CE2, or respectively, CE1 are started in a defined manner with the last character of the first send identification 1SK once again.

The code device SE1 acknowledges the change of direction program RW with an acknowledgement Q2. In addition, via the lines 105U1, 106U1, 103U1, signals and the acknowledgement Q are released. As described, these signals correspond to the signals released from the code device SE2 via the lines 105U2, 106U2, 103U2.

After the code device SE2 has received the acknowledgement Q, with signals via the lines 105U2, 106U2, and 106E2, signals are transmitted which have a similar function to that of the previously described signals released via the lines 104U1, 105U1 and 106E1, and which finally trigger the release of the data from the data terminal device DEE2. The transmission of the data D2 from the data terminal device DEE2 via the lines 103E2, 103U2 occurs in a similar manner as for the transmission of the data from the terminal device DEE1 via the lines 103E1 and 103U1 which were already described.

With the acknowledgements Q, only the recognition of the phase-in program or the change of direction program is acknowledged. With this, the synchronous action of the crypto devices is acknowledged. However, the acknowledgement provides no information concerning the orderly coding and decoding of the data to be transmitted. If for example the code phase is lost between transmitter and receiver during the data transmission, then this is only determinable by means of the receiving data terminal device.

Figure 2:
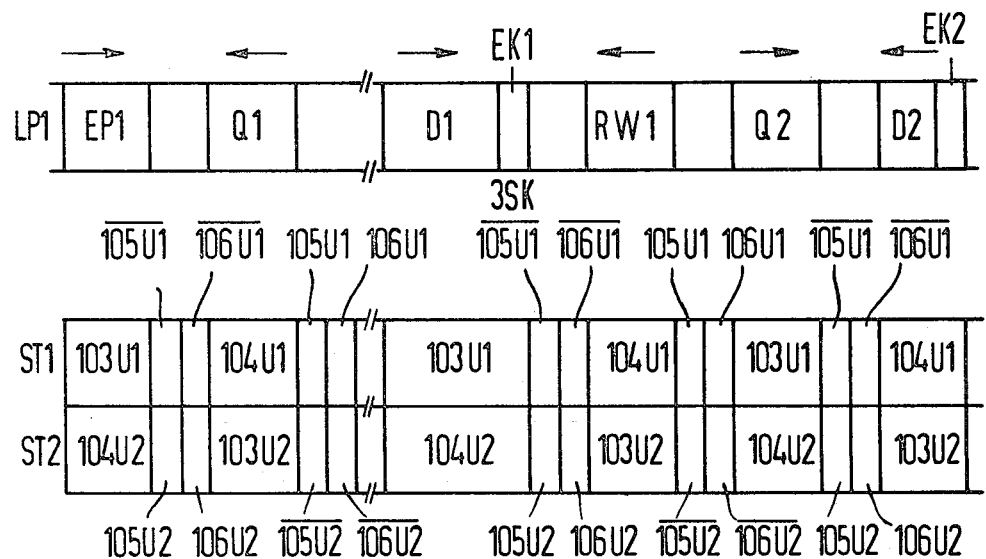
FIG. 2 shows several diagrams with the use of which the time-related course of the method according to FIG. 1 is identifiable.

FIG. 2 shows a scheme from which the time-related course of the individual signals and the corresponding line occupancies are apparent. As was already described with the use of FIG. 1, it concerns a half-duplex operation, whereby via the only line pair LP1, data are alternatingly transmitted in both directions. The uppermost line in FIG. 2 refers to this data transmission. For example, it is apparent from the arrows that first the phase-in program EP1 is transmitted in the one direction, then the acknowledgement Q1 in the opposing direction.

From the second and third lines, the line occupancy of the stations ST1 and ST2 is apparent. The phase-in program EP1 is thus transmitted in the region of the first station ST1 via the line 103U1, and in the region of the second station ST2, is transmitted via the line 104U2. Following this, in the region of the first station ST1, the two lines 105U1 and 106U1 are disconnected and in the region of the second station ST2, and signals are transmitted via the lines 105U2 and 106U2. After this, the acknowledgement Q1 proceeds in the region of the second station ST2 on the line 103U2 and in the region of the first station ST1, on the line 104U1. After this, signals are transmitted via the lines 105U1 and 106U1 and the lines 105U2 and 106U2 are disconnected.

The data D1 and the end identification EK1 are transmitted in the region of the first station ST1 via the line 103U1 and in the region of the second station ST2 via the line 104U2. After this, the lines 105U1 and 106U1 are disconnected and signals are transmitted via the lines 105U2 and 106U2. In the opposing direction, the change of direction program RW1 follows, which program is acknowledged with the acknowledgement Q2. Finally, the data D2 are transmitted from the second station ST2 to the first station ST1.

The connection, or respectively, disconnection of the transmitting device SEN1 of the data transmission device DUE1 and the transmitting device SEN2 of the transmission device DUE2 is represented by the reference symbols e, or respectively, a with the use of the diagrams. For example, it is apparent that the transmitting device SEN1 of the data transmission device DUE1 is disconnected at the end of the phase-in program EP1 and is connected again at the end of the acknowledgement Q1. The connection, or respectively, disconnection of the transmitting device SEN2 proceeds in antiphase (in phase opposition) operation.

The bottom diagrams in FIG. 2 present the phase-in of the crypto units CE1 and CE2. The diagrams show that both crypto units either are both phased in (referenced ep) or are both not phased in. With the end of the first code identification 1SK, both crypto units are phased in and remain phased in until the end of the end identification EK1. As FIG. 1 shows more clearly, the change of direction program RW1 consists of the phase identification PK, the first code identification 1SK and the second code identification 2SK. With transmission of the change of direction program RW1, the two crypto units CE1 and CE2 are phased in at the end of the first code identification 1SK, and remain phased in until the end of the end identification EK2.

With the half-duplex data transmission method described with the use of FIGS. 1 and 2, for the execution of the change of direction RW1, in total 120 bits are required. In the case of each change of direction, therefore, the line pair LP1 must be blocked for a relatively long time for the transmission of the change of direction program. In order to raise the useful information transmitted per unit of time, it would be essentially conceivable to provide a full-duplex transmission system instead of a half-duplex transmission system; with this, as is shown, the messages can be transmitted simultaneously in both direction. A full-duplex transmission system of this kind, however, requires a relatively large technical expense. The present invention is based upon the understanding that the largest expense for a fully-duplex transmission system of this sort is required for the crypto units CE1 and CE2. Under these assumptions, it appears to be practical to lay out the data terminal devices DEE1, DEE2 and the crypto units CE1, CE2, for half-duplex operation and the code devices SE1, SE2, the data transmission devices DUE1, DUE2 and the two line pairs LP1, LP2 for full-duplex operation.

Figure 3:
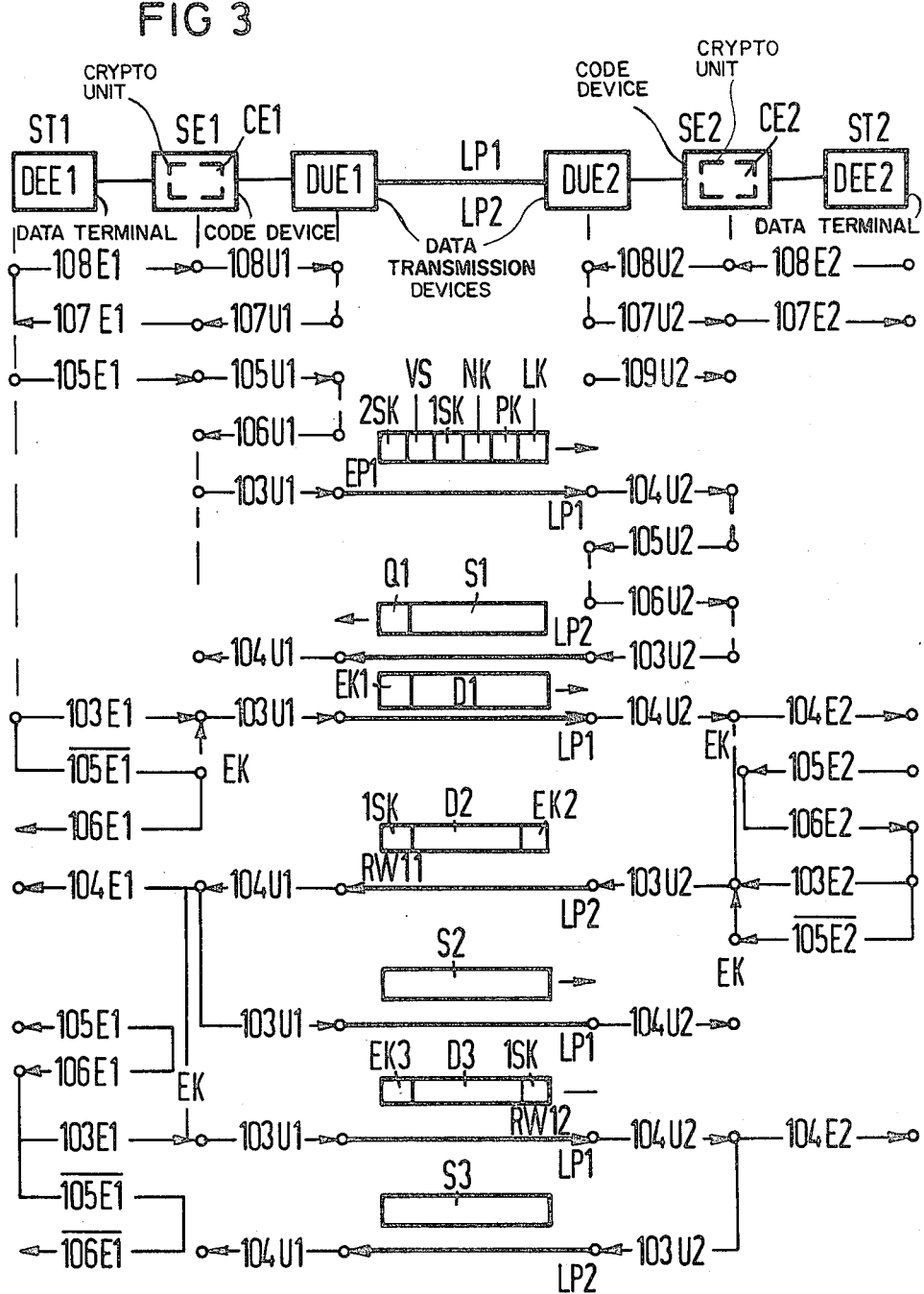
FIG. 3 shows a schematic representation of a method, with the help of which, shortened changes of direction are executable.

FIG. 3 shows schematically a data transmission system of this sort, with the help of which a full-duplex operation is possible between the two code devices SE1 and SE2, whereas the two data terminal devices DEE1, DEE2 and the two crypto units CE1, CE2 are operated in half-duplex operation.

The operation readiness of the data terminal devices DEE1, DEE2, the code devices SE1, SE2 and the transmission devices DUE1, DUE2 is attained similarly as was already described with the use of FIG. 1. In particular, for this, in the region of the first station ST1, signals are transmitted via the lines 108E1, 108U1, 107E1, 107U1 and in the region of the second station ST2, corresponding signals are transmitted via the lines 108E2, 108U2, 107U2, 107E2.

Similarly to the case of FIG. 1, it is assumed that the data terminal devices DEE1 intend to transmit data. For this, again via the lines 105E1, 105U1, 106U1, signals are transmitted from which the code device SE1 finally recognizes that the data transmission device DUE1 is transmission ready. Now, via the line 103U1, from the code device SE1, the phase-in program EP1 is released, which resembles the phase-in program EP1 according to FIG. 1. Also, the signals released via the lines 104U2, 105U2, 106U2 correspond to those signals which were released via the same lines according to FIG. 1.

Via the line 103U2, now, however, the acknowledgement Q1 is released via the second line pair LP2, whereas the same acknowledgement Q1 according to FIG. 1 was released via the first line pair LP1. Aside from these different line pairs, however, the procedures according to FIG. 1 and according to FIG. 2 are identical up to the end of the acknowledgement Q1. After this, according to FIG. 3, the synchronizing signal S1 is transmitted. For example, as synchronizing signal S1, alternatingly in each case two "1" values, or respectively, two "0" values can be transmitted. During the duration of this synchronizing signal S1, the data D1 and the end identification EK1 are transmitted via the lines 103E1, 103U1, 104U2, 104E2. The synchronizing signal S1 thus lasts until the end of the end identification EK1.

After transmission of the data D1 and the end identification EK1, the receiving code device SE2 recognizes the end identification EK1 and immediately causes the change of direction, independently of the state of the line 105E2. The change of direction program RW11 in this case only consists of the first send identification 1SK, whereas the change of direction program RW1 according to FIG. 1 consisted of the phase identification PK, the first send identification 1SK and the second send identification 2SK. Therefore, for the change of direction program RW1, 120 bits were required; however, for the change of direction program RW11, only 40 bits are required. This change of direction program RW11 contains no phase identification since the clock pulse synchronism in both directions is maintained continuously. A new phase-in of the transmission circuit during the change of direction is thus not necessary. It suffices to stop the two crypto units CE1 and CE2 in a defined manner with the last character of the end identification and after change of direction is accomplished to start them again anew with the last character of the first send identification.

Following the change of direction program RW11, the data D2 and the end identification EK2 are transmitted via the line pair LP2. Simultaneously, via the line pair LP1, the synchronizing signal S2 is transmitted. The code device SE1 recognizes the end identification EK2 and after this causes the transmitting of a further change of direction program RW12. The synchronizing signal S2 is thus transmitted during the transmission of the change of direction program RW11, the data D2 and the end identification EK2.

Following the change of direction program RW12, the data D3 and the end identification EK3 are transmitted via the line pair LP1 and simultaneously, in the opposite direction, the synchronizing signal S3 is transmitted via the line pair LP2.

FIG. 4 shows more clearly the time-related sequence of the individual data and signals. In one direction, via the line pair LP1, are transmitted the phase-in program EP1, the data D1, the end identification EK1, the synchronizing signal S2, the change of direction program RW12, the data D3 and the end identification EK3. In the other diection, via the line pair LP2, are transmitted the acknowledgement Q1, the synchronizing signal S1, the change of direction program RW11, the data D2, the end identification EK2, and the synchronizing signal S3.

The two representations show with respect to the crypto units CE1 and CE2 that these crypto units are phased in after the last bit of the send identification 1SK, and remain phased in. In contrast to this, according to FIG. 2, repeated phasing in of the crypto units CE1 and CE2 are required.

In FIG. 4, also the operating states of the receiving devices EMP1, EMP2 of the data transmission devices DUE1, or respectively, DUE2 are represented. According to this, it was assumed that the receiving device EMP2 was already connected with the beginning of the phased in program EP1, whereas the receiving device EMP1 is only connected at the end of the phase-in program EP1.

In contrast to this, the transmitting device SEN1 of the data transmission device DUE1 is connected already at the beginning of the phase-in program EP1, whereas the transmitting device SEN2 of the data transmission device DUE2 is only connected at the end of the phase-in program EP1.

Summarizing, and according to FIG. 3, data of the data terminal device DEE1 are transmitted in the half-duplex operation to the data terminal device DEE2 and conversely. With respect to this, FIG. 4 also makes apparent that either the data D1 and D3 are transmitted from the data terminal device DEE1 to the data terminal device DEE2 in the one direction, or the data D2 are transmitted in the opposing direction. Thus, no simultaneous data transmission proceeds in both directions.

For the phase-in of the two crypto units, transmission occurs from the one code device SE1 out of the phase-in program EP1 to the other code device SE2, and the code device SE2 acknowledges receipt with the acknowledgement Q1. After this, the two code devices SE1 and SE2 communicate via the two data transmission devices DUE1 and DUE2 in full-duplex operation.

After phase-in of the two crypto units CE1, CE2, in one direction, in each case a change of direction program, data and an end identification are transmitted, and in the opposite direction simultaneously a synchronizing signal is transmitted. For example, in one direction via the line pair LP2, the change of direction program RW11, the data D2 and the end identification EK2 are transmitted, and in the opposing direction, via the second line pair LP1, simultaneously the synchronizing signal S2 is transmitted. Following this, via the line pair LP1, the change of direction RW12, the data D3 and the end identification EK3 are transmitted, and simultaneously via the line pair LP2, the synchronizing signal S3 is transmitted.

It can also be directly taken from FIG. 4 that the change of direction programs RW11 and RW12 are not acknowledged. In contrast to this, it is apparent from FIG. 2 that the change of direction program RW1 is acknowledged with the acknowledgement Q2.

Although I have described my invention by reference to specific exemplary embodiments thereof, many changes and modifications thereof may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for coded data transmission in half-duplex operation between data terminal devices of two data stations, in which a first code device in a first data station transmits a phase-in program to a second code device of the second data station, and in which the second code device responds with an acknowledgement, the improvement therein comprising the steps of:
   transmitting between the first and second code devices, via respective first and second data transmission devices, in full-duplex operation;
   phasing-in first and second crypto units in the respective first and second data stations; and
   after phase-in of the crypto units, transmitting change of direction programs, data and end identification in one transmission direction and simultaneously transmitting synchronizing signals in the opposite direction.

2. The improvement of claim 1, comprising the step of:
   forming the synchronizing signals as alternately two binary values of a first kind and two binary values of a second kind.

3. The improvement of claim 1, comprising the step of:
   forming the change of direction program to consist of, in each case, a first send identification.

4. A method for coded data transmission in half-duplex operation between data terminal devices of two data stations, in which a first code device in a first data station transmits a phase-in program to a second code device of the second data station, and in which the second code device responds with an acknowledgement, the improvement therein comprising the steps of:
   transmitting between the first and second code devices, via respective first and second data transmission devices, in full-duplex operation;
   phasing-in first and second crypto units in the respective first and second data stations; and
   after phase-in of the crypto units, and after receipt of the acknowledgement, transmitting data and an end identification in one transmission direction and simultaneously transmitting a synchronizing signal in the opposite direction.

5. A method for coded data transmission in half-duplex operation between data terminal devices of two data stations, in which a first code device in a first data station transmits a phase-in program to a second code device of the second data station, and in which the second code device responds with an acknowledgement, the improvement therein comprising the steps of:

transmitting between the first and second code devices, via respective first and second data transmission devices, in full-duplex operation;

phasing-in first and second crypto units in the respective first and second data stations;

after phase-in of the crypto units, transmitting change of direction programs, data and end identifications in one transmission direction and simultaneously transmitting synchronizing signals in the opposite direction; and transmitting an acknowledgement for each change of direction program.

* * * * *